United States Patent [19]

Russo

[11] 4,151,650

[45] May 1, 1979

[54] LEVEL ASSEMBLY

[76] Inventor: Edward Russo, 5 Division St., Sussex, N.J. 07461

[21] Appl. No.: 859,903

[22] Filed: Dec. 12, 1977

[51] Int. Cl.² .............................................. B43L 7/00
[52] U.S. Cl. .......................................... 33/88; 33/116
[58] Field of Search ........... 33/88, 89, 75 R, 115–120, 33/174 S, 79 R, 1 N

[56] References Cited

U.S. PATENT DOCUMENTS

| 615,806 | 12/1898 | Clymer | 33/75 R |
| 1,014,402 | 1/1912 | Larsen | 33/118 |

FOREIGN PATENT DOCUMENTS

| 802612 | 2/1951 | Fed. Rep. of Germany | 33/75 R |
| 119749 | 4/1927 | Switzerland | 33/118 |

Primary Examiner—Harry N. Haroian
Attorney, Agent, or Firm—Allison C. Collard; Thomas M. Galgano

[57] ABSTRACT

An improved level assembly includes a generally rectangular level, an elongated generally rectangular blade, one end of which is pivotably secured to the level to permit movement thereof about an axis normal to the longitudinal axis of the level, a scale element having scale markings formed thereon for indicating angle degrees and a pointer element disposed for cooperative association with the scale element for indicating a specific degree of angle. Either the scale element or the pointer element is fixed to the level and the other element is coupled to the blade for pivotal movement therewith. The level assembly permits the user to accurately align workpieces at a predetermined angular orientation.

1 Claim, 4 Drawing Figures

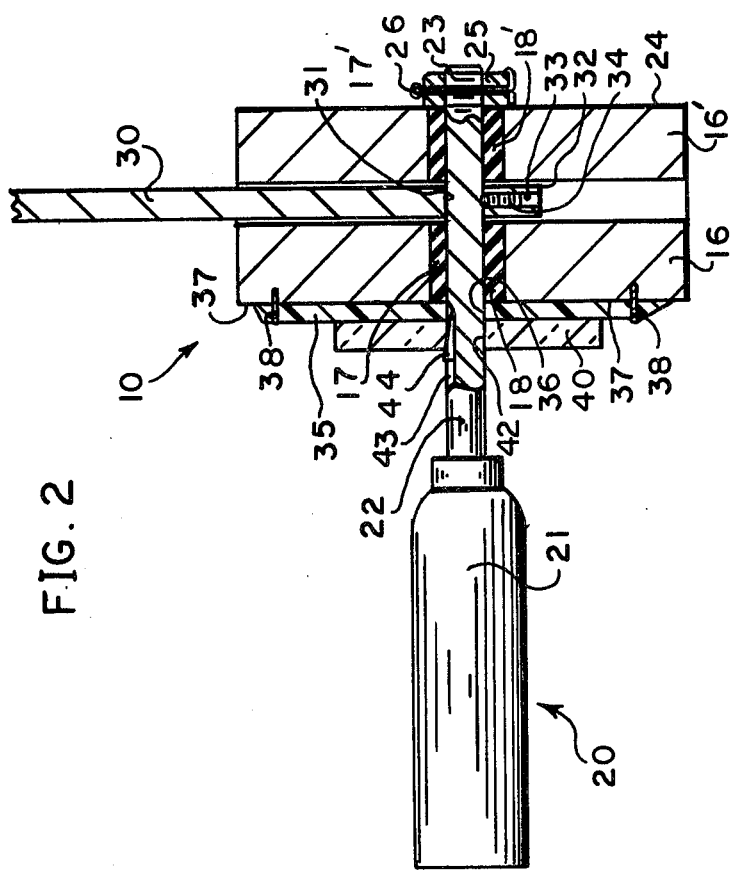
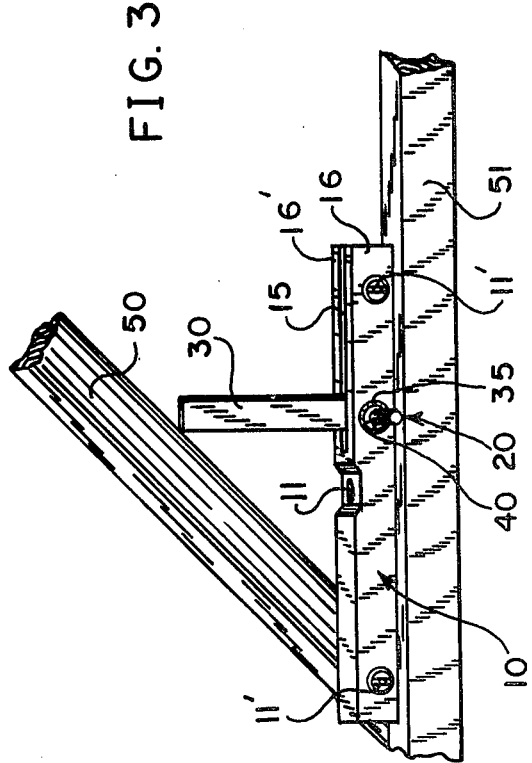
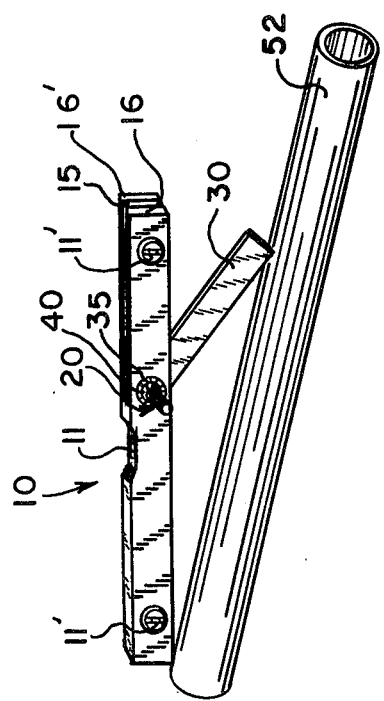

LEVEL ASSEMBLY

This invention relates to an improved level assembly. More particularly, it relates to an improved level assembly which permits the accurate positioning of workpieces at various angles or orientation.

Levels are, of course, widely used in the building and construction trades to insure that the construction elements or workpieces are correctly aligned relative to true horizontal or vertical directions. Typically, the levels are rectangular and have slightly curved glass tubes filled with alcohol or ether mounted thereon. The liquid-filled tubes are used to determine true horizontal or vertical directions by the centering of a bubble in the tube, usually between a pair of spaced-apart hair-lines formed on the tube. While levels of this type are satisfactory for determining true horizontal or vertical dispositions, they have been found unsuitable when it is necessary to align workpieces at different angles of orientation.

Various attempts have been made to improve upon this deficiency. For example, some levels are provided with an extra liquid-filled, glass, tube disposed at an angle of 45°. Levels provided with this additional angularly-oriented bubble sight device permit the accurate disposition of a workpiece at an angle of 45°. However, they do not permit accurate orientation of workpieces at other angles of orientation.

Accordingly, it is an object of the present invention to prove a novel level assembly which permits the accurate positioning of workpieces at various angles of orientation.

It is also an object of the present invention to provide such an improved level assembly which is relatively simple in construction, economical to fabricate and easy to use.

It is a further object of the instant invention to provide such an improved level assembly which provides highly accurate measurements and is reliable and dependable in operation.

Certain of the foregoing and related objects are readily obtained in an improved level assembly which includes a generally rectangular level, an elongated generally rectangular blade, one end of which is pivotably secured to the level, a scale element having scale markings formed thereon for indicating angle degrees and a pointer element disposed for cooperative association with the scale element. The blade is pivotably mounted on the level to permit movement thereof about an axis normal to the longitudinal axis of the level, so that the blade may be moved from a retracted position, in which it assumes a substantially parallel disposition relative to the level, to an extended position, in which the blade assumes an angular disposition relative to the level. The pointer element includes a pointer alignable with the scale markings on the scale element for indicating a specific degree of angle and the scale element and the pointer element are pivotably movable relative to one another with either the scale element or the pointer element being fixed to the level and with the other being coupled to the blade for pivotable movement therewith.

Preferably, the level has a longitudinally-extending, vertically-disposed slot formed therein between the lateral faces thereof and the end of the blade is pivotably mounted in the slot. Most desirably, the scale element consists of a generally flat circular disc having scale markings formed on its face about its periphery, and the pointer element consists of a transparent, generally flat, circular disc having a radially-extending line indicator formed on the face thereof which serves as the pointer. The scale element and the pointer element are preferably coaxially and adjacently disposed.

In a preferred embodiment of the invention, the level has a bore extending transversely through the lateral walls thereof which communicates with the slot thereof. Similarly, the end of the blade has a bore extending therethrough and the scale element and the pointer element each have central bores formed therethrough, which bores are alignable with the bore of the level. The assembly also includes a bolt received through the bores of the level, blade, scale element and pointer element which is coupled to the level for pivotal movement. The end of the blade and the pointer element are most desirably fixed to the bolt for pivotable movement therewith and the scale element is fixed to the outer face of a lateral wall of the level. Most advantageously, the bolt has a handle attached to one end thereof.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings, wherein similar reference characters denote similar elements throughout the several views;

FIG. 2 is a cross-sectional view, in part elevation, taken along line 2—2 of FIG. 1;

FIG. 3 is a perspective view of the device showing its employment in aligning a rafter at an angle of approximately 45°; and, FIG. 4 is a perspective view of the assembly showing it being used to align a pipe at an angle of approximately 20° with respect to the horizontal.

Figure 1:
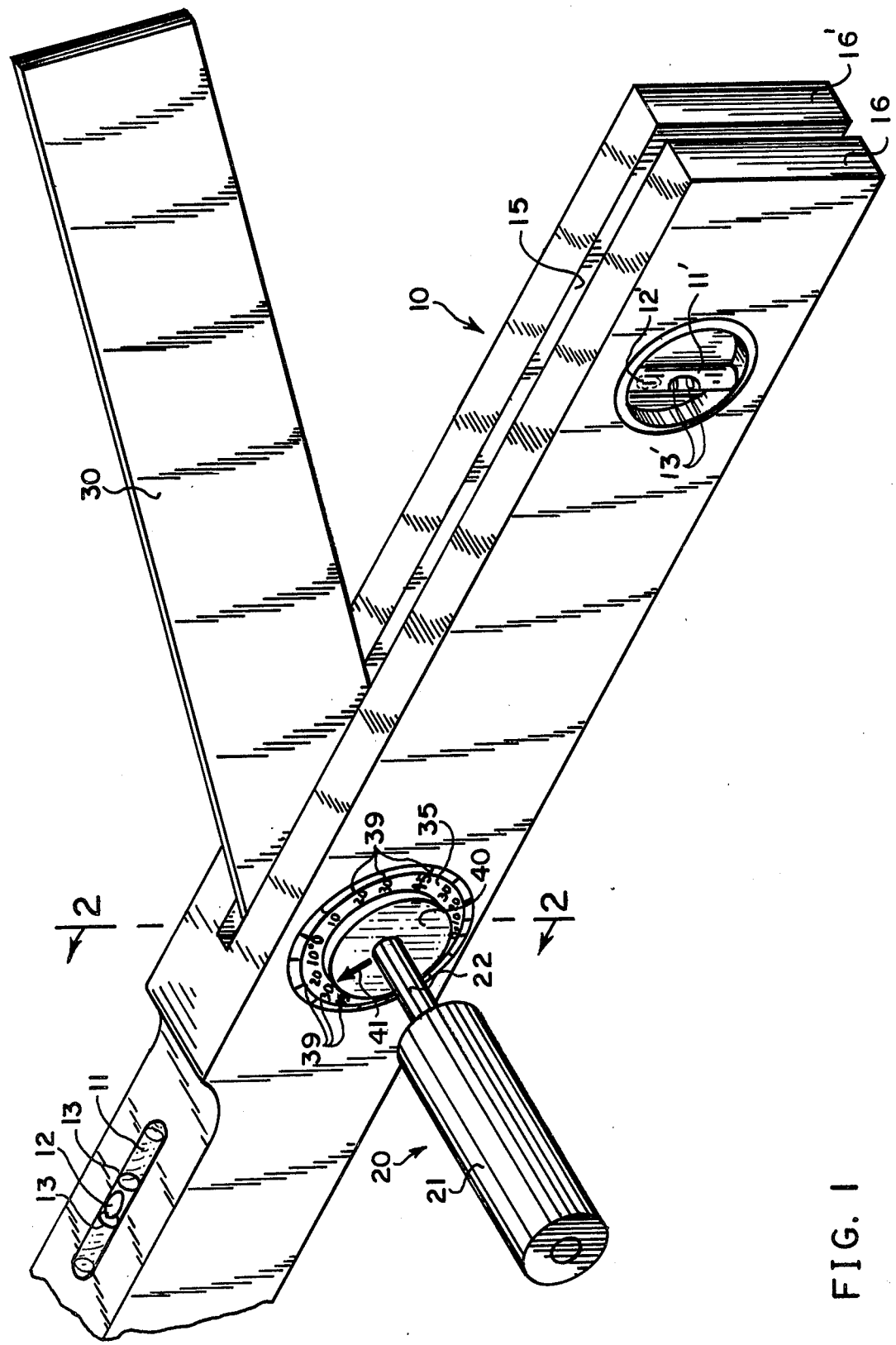
FIG. 1 is a fragmentarily-illustrated perspective view of an improved level assembly embodying the present invention.

Turning now in detail to the appended drawings, therein illustrated is a novel, improved level assembly embodying the present invention, and including a conventional rectangular level 10 having three alcohol- or ether-filled glass tubes 11, 11' mounted therein, one of which is horizontally-disposed (tube 11) and the other two of which are vertically-disposed (tubes 11'). Each of the tubes 11, 11' contain a bubble 12, 12' which, when the level 10 is accurately positioned in either a true horizontal or vertical direction will be aligned between the hash marks or hair-lines, 13, 13'.

Level 10 has a longitudinally-extending, vertically-disposed slot 15 formed therein which divides approximately one-third of level 10 into two spaced-apart lateral arms or prongs 16, 16'. As can be seen more clearly in FIG. 2, lateral arms 16, 16' each have a transversely-extending bore 17, 17' formed therethrough, positioned adjacent to the inner end of slot 15. In each of the bores 17, 17', there is received a cylindrical friction sleeve 18, 18', preferably made from rubber or plastic. A control arm 20 is also provided which includes a handle portion 21 at one end an elongated shaft 22 at its other end. Shaft 22 of control arm 20 is received through the frictional sleeves 18, 18'. The outer end 23 of shaft 22 is externally threaded and extends outwardly from the rear face 24 of arm 16'. A nut 25 is received on the threaded end 23 of shaft 22 and a cotter pin 26 is received through both nut 25 and shaft end 23 to ensure that shaft 22 will not be inadvertently pulled out or withdrawn from friction sleeves 18, 18'.

A rectangular blade 30 is disposed between the lateral arms 16, 16'. Blade 30 has a inner end portion having a transversely-extending bore 31 formed therethrough by which it is received on shaft 22. The end face 32 of inner end portion of blade 30 has a longitudinally-extending, internally threaded bore 33 formed therein opening onto bore 31. An allen key 34 is threadably received in bore 33 to rigidly secure the blade 30 to shaft 22 to permit pivotable or rotational movement therewith.

A scale element 35 consisting of a flat circular disc which has a central opening 36 is received on shaft 22 and is fixed against the front face 37 of lateral arm 16 by means of a pair of pins 38. As seen best in FIG. 1, disc 35 has scale markings 39 formed thereon disposed about the periphery of its front face which indicate a range of possible blade angles. Disposed immediately in front of disc 35, is a pointer element 40 consisting of a plastic, transparent, flat circular disc which has a central opening 42 by which it is received on shaft 22. A V-shaped, longitudinally-extenting slot 43 is formed on shaft 22, adjacent to pointer element 40, and a wedge member 44 is inserted into slot 43 to rigidly secure pointer element 40 onto shaft 22 to permit rotating therewith; the wedge member 44 also cooperating with nut 25 and pin 26 to prevent disengagement of control arm 20 from level 10. Pointer element 40 has a radially-extending arrow indicator 41 on its front face which serves, in cooperation with scale element 35, to indicate the angular orientation of a workpiece (which well be described in greater detail hereinbelow).

In operation, when the user simply wishes to determine true horizontal or vertical orientations of a workpiece, the handle portion 21 of control arm 20 is rotated to, in turn, position blade 30 in a retracted position relative to level 10 (in which position the arrow indicator 41 will be aligned with the zero-degree scale marking on the face of scale element 35). The level is then used in a conventional manner by aligning the appropriate bubble 12, 12' between the respective hash lines 13, 13' of tubes 11, 11'. It should be appreciated that blade 30 is suitably dimensioned so that in its retracted position its top, bottom and outer end faces will be flush with the top, bottom and outer end faces of lateral arms 16, 16' respectively.

As shown in FIG. 3, when it is desired to measure the angular orientation of a workpiece, such as a rafter 50, relative to a cross beam 51, the level 10 is placed on the cross-beam (assuming an accurate horizontal disposition thereof which can be checked by siting the bubble 12 between hash lines 13 of tube 11) and the handle portion 21 of control arm 20 is pivoted in a counterclockwise direction to, in turn, pivot blade 30 in a similar direction until it abuts rafter 50. Due to the simultaneous rotation of pointer element 40, the arrow indicator thereof will indicate the angle of orientation of rafter 50 which, in this example, is approximately 45 degrees. As can be appreciated, although rafter 50 is at an angle of 45° with respect to level 10, blade 30 is actually disposed at an angle of 90°. Consequently, scale markings 39 are appropriately spaced to take into account this 1:2 degree ratio.

As shown in FIG. 4, the level 10 could also be used to determine the degree of pitch of a pipe 52. In this case, one end of the level 10 would be placed upon the pipe 52 and then the handle portion 21 of the control arm 20 would be pivoted in a clockwise direction, to, in turn, pivot blade 30 in a similar direction. The handle portion 21 is pivoted until blade 30 abuts pipe 52 and the bubble 12 is aligned between the hash lines 13 of tube 11. At this time, the arrow indicator 41 will accurately indicate on scale element 40 the degree of pitch of pipe 52 which, in this example, is approximately 20 degrees from a horizontal axis.

It should also be appreciated that the level could be used to set a workpiece at a particular angle of orientation. In this case, the handle portion 21 of control handle 20 would be rotated until the arrow indicator and the blade are set at the desired degree of orientation. Then the outer end of the blade 30 and the end of level 10 opposite its lateral arms 16, 16' would be placed against the workpiece. The workpiece would then be moved until the bubble 12, 12' in the appropriate tube 11, 11' is aligned between the hash-lines 13, 13'. At this point, the workpiece would be positioned at the desired degree of inclination. It should also be noted that the frictional sleeves 16, 16' serve to inhibit free rotation of control handle 20 and blade 30 so as to ensure that the blade will not slip from its intended position of angular orientation.

While only one embodiment of the invention has been described and illustrated, it should be appreciated that various modifications may be made as will be apparent to those skilled in the art. For example, while the blade is preferably made from steel, other metals or materials such as plastic or wood could also be employed. In addition, although the blade in the level construction illustrated can only be rotated approximately through an arc of 180 degrees, the slot could possibly be extended so as to permit its rotation through an arc of 360 degrees. Furthermore, while it is preferable that the scale element be fixed to the level and the pointer element rotate with the blade, this could be reversed so long as relative movement therebetween is maintained. Finally, it should also be appreciated that the various elements of the level assembly could be coupled together by various means as long as their functional relationships remain unaltered.

What is claimed is:

1. An improved level assembly comprising:
 a generally rectangular level body having bubble levels mounted therein, said level body having at one end thereof a pair of laterally spaced arms defining a longitudinally extending, vertically disposed slot therebetween, coaxial bores extending transversely through each said lateral arm and each bore communicating with said slot;
 a cylindrical friction sleeve mounted within each said bore in said lateral arms;
 an elongated, generally rectangular blade, one end of which has a bore extending transversely therethrough and which is pivotably mounted in said slot of said level to permit movement thereof about an axis normal to the longitudinal axis of said level so that said blade may be moved from a retracted position, in which said blade assumes a substantially parallel disposition relative to said level, to an extended position, in which said blade assumes an angular disposition relative to said level;
 a scale element having scale markings formed thereon for indicating angle degrees, said scale element comprising a generally flat, circular disc having a central bore formed therethrough and scale markings formed on the face thereof about its periphery;

a pointer element disposed for cooperative association with said scale element, said pointer element including a pointer alignable with said scale markings on said scale element for indicating a specific degree of angle, said pointer element comprising a transparent, generally flat circular disc having a central bore formed therethrough and a radially-extending line indicator formed on the face thereof which serves as said pointer, said scale element and said pointer element being adjacently disposed and coaxially aligned with said bore of said level;

a bolt having a handle attached to one end thereof rotatively and frictionally received through said friction sleeves & extending through said bores of said blade, scale element & said pointer element, means for fixing the end of said blade to said bolt and means for fixing said pointer element to said bolt for rotational movement with said bolt, said scale element being fixed to an outside face of one of said arms adjacent said pointer element whereby said blade and pointer element are rotated by said handle and said pointer element is read against said scale element, said friction sleeves serving to inhibit free rotation of said handle and said blade so as to ensure that said blade will not slip from its intended position of angular orientation.

* * * * *